United States Patent
Park et al.

(10) Patent No.: US 9,601,770 B2
(45) Date of Patent: Mar. 21, 2017

(54) PRECURSOR FOR PREPARATION OF LITHIUM COMPOSITE TRANSITION METAL OXIDE AND METHOD OF PREPARING THE SAME

(71) Applicant: LG Chem, Ltd., Seoul (KR)

(72) Inventors: Byung Chun Park, Daejeon (KR); Sun Sik Shin, Daejeon (KR); Sang Min Park, Daejeon (KR); Ho Suk Shin, Daejeon (KR); Hye Lim Jeon, Gyeonggi-do (KR); Bo Ram Lee, Daejeon (KR)

(73) Assignee: LG Chem, Ltd. (KR)

( * ) Notice: Subject to any disclaimer, the term of this patent is extended or adjusted under 35 U.S.C. 154(b) by 38 days.

(21) Appl. No.: 14/504,526

(22) Filed: Oct. 2, 2014

(65) Prior Publication Data

US 2015/0034865 A1 Feb. 5, 2015

Related U.S. Application Data

(63) Continuation of application No. PCT/KR2013/003714, filed on Apr. 30, 2013.

(30) Foreign Application Priority Data

May 4, 2012 (KR) .................. 10-2012-0047427

(51) Int. Cl.
*H01M 4/28* (2006.01)
*H01M 4/505* (2010.01)
(Continued)

(52) U.S. Cl.
CPC ............ *H01M 4/505* (2013.01); *C01G 45/00* (2013.01); *C01G 45/02* (2013.01); *C01G 53/006* (2013.01);
(Continued)

(58) Field of Classification Search
CPC .................. H01M 4/131; C01G 53/006
(Continued)

(56) References Cited

U.S. PATENT DOCUMENTS

| 8,394,299 B2 | 3/2013 | Shin et al. | |
|---|---|---|---|
| 2004/0179993 A1* | 9/2004 | Dahn ................... | C01G 53/006 423/594.4 |

(Continued)

FOREIGN PATENT DOCUMENTS

| CN | 101734636 A | 6/2010 |
|---|---|---|
| CN | 101998932 A | 3/2011 |

(Continued)

OTHER PUBLICATIONS

International Search Report from PCT/KR2013/003714 dated Aug. 21, 2013.

(Continued)

*Primary Examiner* — Khanh Tuan Nguyen
(74) *Attorney, Agent, or Firm* — Lerner, David, Littenberg, Krumholz & Mentlik, LLP

(57) ABSTRACT

Disclosed are a transition metal precursor for preparation of a lithium composite transition metal oxide, the transition metal precursor including a composite transition metal compound represented by Formula 1 below and a hydrocarbon compound, and a method of preparing the same:

$$Mn_aM_b(OH_{1-x})_2 \quad (1)$$

wherein M is at least two selected from the group consisting of Ni, Co, Mn, Al, Cu, Fe, Mg, B, Cr, and second period transition metals; $0.4 \leq a \leq 1$; $0 \leq b \leq 0.6$; $a+b \leq 1$; and $0 \leq x \leq 0.5$, in which the transition metal precursor includes a particular composite transition metal compound and a hydrocarbon compound, and thus, when a lithium composite transition metal oxide is prepared using the same, carbon may be present in lithium transition metal oxide particles and/or on (Continued)

surfaces thereof, whereby a secondary battery including the lithium composite transition metal oxide exhibits excellent rate characteristics and long lifespan.

16 Claims, 1 Drawing Sheet

(51) Int. Cl.
*H01M 4/131* (2010.01)
*H01M 4/36* (2006.01)
*C01G 45/00* (2006.01)
*C01G 53/00* (2006.01)
*H01M 4/525* (2010.01)
*C01G 45/02* (2006.01)

(52) U.S. Cl.
CPC ............ *C01G 53/44* (2013.01); *H01M 4/131* (2013.01); *H01M 4/362* (2013.01); *H01M 4/525* (2013.01); *C01P 2004/03* (2013.01)

(58) Field of Classification Search
USPC ..................... 252/182.1; 423/594.4; 429/223
See application file for complete search history.

(56) References Cited

U.S. PATENT DOCUMENTS

| 2011/0027651 | A1 | 2/2011 | Sun et al. |
| 2011/0300442 | A1 | 12/2011 | Huang |
| 2012/0043499 | A1 | 2/2012 | Shin et al. |
| 2013/0266868 | A1* | 10/2013 | Sun ....................... H01M 4/131 429/223 |

FOREIGN PATENT DOCUMENTS

| EP | 2871161 A1 | 5/2015 |
| KR | 2009-0102138 A | 9/2009 |
| KR | 2009-0105868 A | 10/2009 |
| KR | 2011-0071284 A | 6/2011 |
| KR | 2011-0073630 A | 6/2011 |

OTHER PUBLICATIONS

Chang, Zhao-Rong, et al., "Effect of Hydrazine on the Performance of LiNi0.5Mn1.5O4 Cathode Mterials." Acta Physico-Chimica Sinica, Oct. 2010, vol. 26, No. 10, pp. 2633-2637. (English translation of Abstract only.).

* cited by examiner

PRECURSOR FOR PREPARATION OF LITHIUM COMPOSITE TRANSITION METAL OXIDE AND METHOD OF PREPARING THE SAME

CROSS-REFERENCE TO RELATED APPLICATIONS

The present application is a continuation of International Application No. PCT/KR2013/003714 filed Apr. 30, 2013, which claims priority from Korean Application No. 10-2012-0047427 filed May 4, 2012, the disclosures of which are hereby incorporated herein by reference.

TECHNICAL FIELD

The present invention relates to a precursor for preparation of a lithium composite transition metal oxide and a method of preparing the same. More particularly, the present invention relates to a transition metal precursor used to prepare a lithium composite transition metal oxide and including a particular composite transition metal compound and a hydrocarbon compound and a method of preparing the same.

BACKGROUND ART

As mobile device technology continues to develop and demand therefor continues to increase, demand for secondary batteries as energy sources is rapidly increasing. Among these secondary batteries, lithium secondary batteries, which have high energy density and voltage, long cycle lifespan, and a low self-discharge rate, are commercially available and widely used.

As cathode active materials for lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure, and the like and lithium-containing nickel oxides such as $LiNiO_2$ is also under consideration.

Among cathode active materials, $LiCoO_2$ is widely used due to excellent overall physical properties such as excellent cycle properties, and the like. However, $LiCoO_2$ is low in safety and expensive due to resource limitations of cobalt as a raw material. Meanwhile, lithium manganese oxides, such as $LiMnO_2$, $LiMn_2O_4$, and the like, are advantageous in that they contain Mn that is abundant as a raw material and environmentally friendly and thus are drawing much attention as a cathode active material that can replace $LiCoO_2$. However, such lithium manganese oxides have low capacity and poor cycle properties.

In addition, lithium nickel-based oxides such as $LiNiO_2$ are less expensive than cobalt-based oxides and, when charged to 4.25 V, the lithium nickel-based oxides have high discharge capacity. Thus, reversible capacity of doped $LiNiO_2$ approximates to 200 mAh/g, which exceeds the capacity of $LiCoO_2$ (about 153 mAh/g). Accordingly, in spite of somewhat low average discharge voltage and volumetric density, commercially available batteries including $LiNiO_2$ as a cathode active material have improved energy density and therefore research into these nickel-based cathode active materials has recently been underway in order to develop high-capacity batteries. However, problems of the nickel-based cathode active materials such as $LiNiO_2$, such as high production costs, swelling due to gas generated by batteries, low chemical safety, high pH, and the like, remain unsolved.

Therefore, composite metal oxides have been proposed as an alternative. Among composite metal oxides, $xLi_2MO_3*(1-x)LiMeO_2$, where M is at least one element selected from Mn, Zr, and Ti; and Me is at least one element selected from Ni, Co, Mn, Cr, Fe, V, Al, Mg, and Ti consists of a solid-solution complex of $Li_2MO_3$ and $LiMeO_2$, and thus, may be stable at high voltage and have high discharge capacity. When such composite metal oxides are used in a general co-precipitation process, however, it is difficult to effectively synthesize a transition metal precursor used to prepare a composite metal oxide due to a high manganese content.

In spite of a variety of approaches as described above, a precursor for preparation of a lithium composite transition metal oxide which exhibits satisfactory performance and a lithium composite transition metal oxide including the same have not yet been developed.

DISCLOSURE

Technical Problem

Therefore, the present invention has been made to solve the above problems and other technical problems that have yet to be resolved.

As a result of a variety of extensive and intensive studies and experiments, the inventors of the present invention developed a precursor containing a particular composite transition metal compound and a hydrocarbon compound and confirmed that a secondary battery based on a lithium composite transition metal oxide prepared from the precursor exhibits excellent rate characteristics and long lifespan and has high charge and discharge efficiency, thus completing the present invention.

Technical Solution

In accordance with one aspect of the present invention, provided is a transition metal precursor used to prepare a lithium composite transition metal oxide, which is an electrode active material for a lithium secondary battery, the transition metal precursor including a composite transition metal compound represented by Formula 1 below and a hydrocarbon compound:

$$Mn_aM_b(OH_{1-x})_2 \qquad (1)$$

wherein M is at least two selected from the group consisting of Ni, Co, Mn, Al, Cu, Fe, Mg, B, Cr, and second period transition metals;

$0.4 \le a \le 1$; $0 \le b \le 0.6$; $a+b \le 1$; and $0 < x < 0.5$.

As described above, to satisfy high energy demand due to development of a variety of power storage devices, research into a method of mixing various metal oxides to prepare a cathode active material is underway. However, in composite metal oxides having the formula $xLi_2MO_3*(1-x)LiMeO_2$, where M is at least one element selected from Mn, Zr, and Ti, and Me is at least one element selected from Ni, Co, Mn, Cr, Fe, V, Al, Mg, and Ti, when the amount of Mn is approximately 40 mol % or greater based on a total amount of transition metals, oxidation of Mn readily occurs by dissolved oxygen in an aqueous solution used in a process of preparing a precursor using a general co-precipitation method and thus uniform precipitation of the transition metal element is difficult.

Thus, the inventors of the present invention recognized these problems and repeatedly performed a variety of extensive and intensive studies and experiments. As a result, the inventors of the present invention discovered that, when a transition metal precursor for preparation of a composite metal oxide containing a large amount of Mn includes a predetermined hydrocarbon compound, the hydrocarbon compound serves as a reducing agent and thus suppresses oxidation of Mn, and the hydrocarbon compound is carbonized and remains in closed pores of the transition metal precursor through a sintering process and thus, when a lithium composite transition metal oxide is prepared using the transition metal precursor, electrochemical properties thereof are enhanced.

In Formula 1 above, M is at least two selected from the above-defined elements.

In one embodiment, M is at least one transition metal of Ni and Co and thus the lithium composite transition metal oxide may exhibit properties of at least one of the transition metals. In a particularly preferable embodiment, M includes both Ni and Co.

For example, $0.5 \leq a \leq 1$ and $0.1 \leq b \leq 0.5$.

The composite transition metal compound may be, for example, a composite transition metal compound represented by Formula 2 below:

$$Mn_a \cdot Ni_c Co_{1-(a'+c+d)} M'_d (OH_{1-x})_2 \quad (2)$$

wherein $0.6 \leq a' \leq 1$; $0.1 \leq c \leq 0.5$; $0 \leq d \leq 0.1$; $a'+c+d \leq 1$; M' is at least one selected from the group consisting of Al, Mg, Cr, Ti, Si, Cu, Fe, and Zr; and x is the same as defined in Formula 1 above.

The composite transition metal compound contains large amounts of Mn and Ni, and thus, is suitable for use in preparing a cathode active material for a high-capacity lithium secondary battery. When the amount of Ni is less than 0.1 mole based on the total metals, it is difficult to achieve a stable crystal structure and thus high capacity is not obtained. On the other hand, when the amount of Ni exceeds 0.5 mole, safety is significantly reduced. Therefore, the amount of Ni may be in the range of 0.15 to 0.4.

In some embodiments, M' may be substituted with at least one selected from the group consisting of Al, Mg, Cr, Ti, and Si in an amount of 0.1 or less, for example, in an amount of 0.05 or less.

The amount (i.e., $1-(a'+c+d)$) of cobalt varies according to the amount (i.e., $(a'+c+d)$) of nickel, manganese, and M'. When the amount of cobalt is too large, overall raw material costs increase due to the large amount of cobalt and reversible capacity somewhat decreases. On the other hand, when the amount of cobalt is too small, it may be difficult to achieve both sufficient rate characteristics and high powder density of a battery. Thus, the amount (i.e., $(a'+c+d)$) of nickel, manganese, and M' may be in the range of 0.8 to 0.95.

The transition metal precursor according to the present invention includes a predetermined hydrocarbon compound and the composite transition metal compound of Formula 1.

In one embodiment, the amount of the composite transition metal compound may be in the range of 30 wt % or more, for example, in the range of 50 wt % or more.

The hydrocarbon compound is not particularly limited so long as it acts as a reducing agent in a process of preparing the transition metal precursor. For example, the hydrocarbon compound may be hydrazine, oxalic acid, ascorbic acid, or a saccharide-based material. Specifically, the hydrocarbon compound may be a saccharide-based material.

For example, the saccharide-based material may be at least one selected from the group consisting of fructose, sucrose, glucose, galactose, lactose, maltose, starch, and dextrin. In particular, the saccharide-based material may be sucrose.

The amount of the hydrocarbon compound may be in the range of 0.1 to 10 wt % based on a total amount of the transition metal precursor. When the amount of the hydrocarbon compound is too small, the hydrocarbon compound does not function as desired. On the other hand, when the amount of the hydrocarbon compound is too large, the contents of transition metals of the transition metal precursor are small, which may lead to deterioration of electrochemical properties after sintering.

The hydrocarbon compound may be present in the transition metal precursor and/or on a surface of the transition metal precursor. In particular, the transition metal precursor may have closed pores and at least a portion of the hydrocarbon compound may be included in the closed pores thereof.

Hereinafter, a method of preparing the above-described transition metal precursor will be described.

The transition metal precursor may be prepared using a basic material and a compound including transition metal-containing salts and a predetermined hydrocarbon compound by co-precipitation. Co-precipitation is a process wherein at least two transition metal elements are co-deposited in an aqueous solution.

In particular, the method of preparing the transition metal precursor may include: preparing an aqueous transition metal solution containing transition metal salts for preparation of the transition metal precursor; mixing a hydrocarbon compound into the aqueous transition metal solution in an amount of 0.01 to 10 mol % based on a total amount of the aqueous transition metal solution; and performing co-precipitation by adding a strong base to the mixed solution.

That is, the composite transition metal compound containing at least two transition metals may be prepared by mixing transition metal-containing salts in a desired molar ratio in consideration of the amounts of the transition metals to prepare an aqueous solution, adding a predetermined amount of a hydrocarbon compound thereto as described above, and performing co-precipitation while pH of the resulting solution is maintained basic by adding a strong base such as sodium hydroxide or the like and, if necessary, an additive such as an ammonia source or the like.

When the amount of the hydrocarbon compound is less than 0.01 mol %, the hydrocarbon compound does not function as desired. On the other hand, when the amount of the hydrocarbon compound exceeds 10 mol %, the contents of transition metals of the transition metal precursor are small, which may lead to deterioration of electrochemical properties after sintering. In one embodiment, the amount of the hydrocarbon compound may be in the range of 0.05 to 3 mol % based on a total amount of the aqueous transition metal solution.

In addition, desired average particle diameter, particle diameter distribution and particle density may be adjusted by appropriately adjusting temperature, pH, reaction time, slurry concentration, ion concentration, and the like. In this regard, pH may be in the range of 9 to 13, for example, in the range of 10 to 12, and, in some cases, reaction may be performed in multiple steps.

The transition metal-containing salts may contain anions that readily decompose and volatilize in a sintering process, and may be, for example, sulfates or nitrates, in particular sulfates. Examples of transition metal-containing salts include, but are not limited to, nickel sulfate, cobalt sulfate, manganese sulfate, nickel nitrate, cobalt nitrate, and manganese nitrate.

The basic material may be, for example, sodium hydroxide, potassium hydroxide, lithium hydroxide, or the like, preferably, sodium hydroxide, but is not limited thereto.

In one embodiment, an additive and/or alkaline carbonate capable of forming complexes with the transition metals in the co-precipitation process may be further used. Examples of the additive include, but are not limited to, an ammonium ion source, an ethylene diamine-based compound, and a citric acid-based compound. Examples of the ammonium ion source include, but are not limited to, aqueous ammonia, an aqueous ammonium sulfate solution, and an aqueous ammonium nitrate solution. The alkaline carbonate may be selected from the group consisting of ammonium carbonate, sodium carbonate, potassium carbonate, and lithium carbonate. In some cases, at least two of these compounds may be used in combination.

The amounts of additive and alkaline carbonate may be appropriately determined by considering the amounts of transition metal-containing salts, pH, or the like.

The hydrocarbon compound is carbonized and remains in the closed pores of the transition metal precursor synthesized through the above-described process, and the carbonized hydrocarbon compound exhibits surface treatment effects on the transition metal precursor. Thus, the transition metal precursor according to the present invention has increased circularity and more uniform particle size.

The present invention also provides a cathode active material prepared from the transition metal precursor. In particular, a lithium composite transition metal oxide, which is a cathode active material for a lithium secondary battery, may be prepared by mixing the transition metal precursor and a lithium precursor and performing sintering of the mixture in an oxidizing atmosphere.

The cathode active material is prepared using the transition metal precursor having closed pores in which the hydrocarbon compound is carbonized and remains and thus contains lithium transition metal oxide particles and carbon present in the particles and/or on surfaces of the particles, whereby excellent electrochemical properties may be obtained.

The lithium composite transition metal oxide may be used as an electrode active material for a lithium secondary battery, and may be used alone or in combination with other known electrode active materials for lithium secondary batteries.

In addition, the lithium composite transition metal oxide contains at least two transition metals. Examples of the lithium composite transition metal oxide include, but are not limited to, layered compounds such as lithium cobalt oxide ($LiCoO_2$) and lithium nickel oxide ($LiNiO_2$) substituted with one or more transition metals; lithium manganese oxides substituted with at least one transition metal; lithium nickel-based oxides having the formula $LiNi_{1-y}M_yO_2$, where M is at least one element selected from Co, Mn, Al, Cu, Fe, Mg, B, Cr, Ti, Si, Zn, and Ga; and $0.01 \leq y \leq 0.9$; lithium nickel cobalt manganese composite oxides represented by $Li_{1+z}Ni_bMn_cCo_{1-(b+c+d)}M_dO_{(2-e)}N_e$, where $-0.5 \leq z \leq 0.5$, $0.3 \leq b \leq 0.9$, $0.1 \leq c \leq 0.9$, $0 \leq d \leq 0.1$, $0 \leq e \leq 0.05$, $b+c+d<1$, M is Al, Cu, Fe, Mg, B, Mg, Cr, Ti, Si, or Y, and N=F, P, or Cl; and composite oxides represented by $xLi_2MO_3 \cdot (1-x)LiMeO_2$, where M is at least one element selected from Mn, Zr, and Ti, and Me is at least one element selected from Ni, Co, Mn, Cr, Fe, V, Al, Mg, and Ti.

In a specific embodiment, the lithium composite transition metal oxide may be a lithium composite transition metal oxide containing Co, Ni, and Mn.

Conditions of reaction between the transition metal precursor for preparation of the lithium composite transition metal oxide and a lithium-containing material are known in the art, and thus, a detailed description thereof is omitted herein.

The present invention also provides a cathode including the lithium composite transition metal oxide as a cathode active material and a lithium secondary battery including the same.

The cathode is prepared by coating a mixture of the cathode active material, a conductive material, and a binder on a cathode current collector and drying the coated cathode current collector. In this regard, the mixture may further include a filler as desired.

The cathode current collector is generally fabricated to a thickness of 3 to 500 μm. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 20 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the active material and the conductive material and in binding of the active material to the cathode current collector. The binder is typically added in an amount of 1 to 20 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The lithium secondary battery includes a cathode, an anode, a separator, and a lithium salt-containing non-aqueous electrolyte, and other components of the lithium secondary battery will now be described in detail.

The anode is fabricated by coating an anode material on an anode current collector and drying the coated anode current collector. In some cases, the above-described components may be further used, in addition to the anode material.

Examples of the anode material include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, and $Sn_xMe_{1-x}Me'_yO_z$ where Me: Mn, Fe, Pb or Ge; Me': Al, B, P, Si, Group I, Group II and Group III elements, or halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and an anode active material. In addition, the anode current collector may be used in various forms including films, sheets, foils, nets, porous structures, foams, and non-woven fabrics.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and a lithium salt. As the non-aqueous electrolyte, a non-aqueous electrolytic solution, an organic solid electrolyte, or an inorganic solid electrolyte may be used.

For example, the non-aqueous electrolytic solution may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

Effects of Invention

As apparent from the fore-going, a transition metal precursor according to the present invention includes a particular composite transition metal compound and a hydrocarbon compound, and thus, when a lithium composite transition metal oxide is prepared using the same, carbon may be present inside lithium transition metal oxide particles and/or on surfaces of the particles, whereby a secondary battery including the lithium composite transition metal oxide may exhibit excellent rate characteristics and long lifespan.

BRIEF DESCRIPTION OF THE DRAWINGS

The above and other objects, features and other advantages of the present invention will be more clearly understood from the following detailed description taken in conjunction with the accompanying drawing, in which.

BEST MODE

Figure 1:
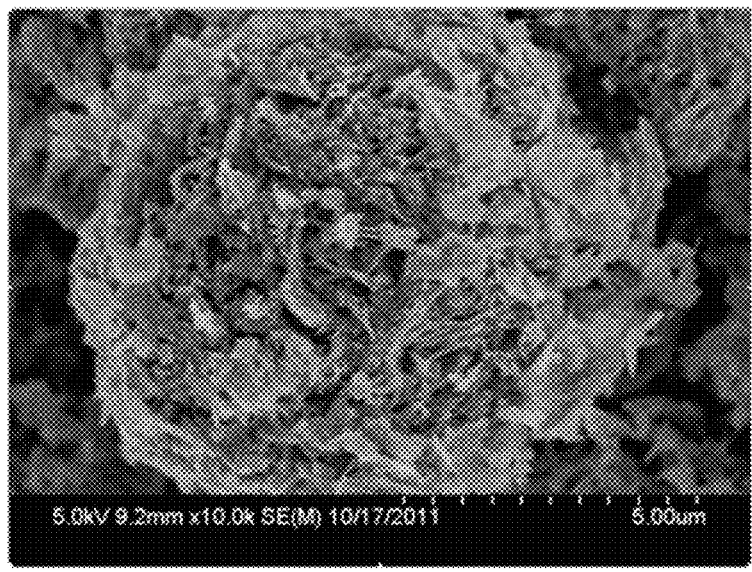
FIG. 1 is a scanning electron microscopy (SEM) image of a precursor prepared according to Example 1, which was captured using FE-SEM (model S-4800 available from Hitachi)

Now, the present invention will be described in more detail with reference to the following examples. These examples are provided only for illustration of the present invention and should not be construed as limiting the scope and spirit of the present invention.

Example 1

A 4 L wet reactor tank was filled with 3 L of distilled water and was continuously purged with nitrogen gas at a rate of 2 L/min to remove dissolved oxygen. Distilled water in the tank was maintained at a temperature of 45 to 50° C. using a thermostat. In addition, the distilled water in the tank was stirred at 1000 to 1200 rpm using an impeller connected to a motor installed outside the tank.

Manganese sulfate, nickel sulfate, and cobalt sulfate were mixed in a molar ratio of 0.5:0.4:0.1 to prepare a 1.5 M aqueous transition metal solution. Thereafter, 2 mol % of sucrose was mixed therewith. Separately, a 3M aqueous sodium hydroxide solution was prepared. The aqueous transition metal solution was continuously pumped into the wet reactor tank, using a metering pump, at a rate of 0.18 L/hr. The aqueous sodium hydroxide solution was pumped in a rate-variable manner by a control unit for adjusting a pH of the distilled water in the tank such that the distilled water in the wet reactor tank was maintained at a pH of 11.0 to 11.5. In this regard, a 30% ammonia solution as an additive was continuously co-pumped to the reactor at a rate of 0.035 to 0.04 L/hr.

Flow rates of the aqueous transition metal solution, the aqueous sodium hydroxide solution, and the ammonia solution were adjusted such that an average residence time of the solutions in the wet reactor tank was approximately 5 to 6 hours. After the reaction in the tank reached a steady state, a certain duration of time was given to synthesize a composite transition metal precursor with a higher density.

After reaching the steady state, the nickel-cobalt-manganese composite transition metal precursor, which was prepared by 20-hour continuous reaction between transition metal ions of the transition metal aqueous solution, hydroxide ions of the sodium hydroxide, and ammonia ions of the ammonia solution, was continuously obtained through an overflow pipe installed on the top side of the tank.

The resulting composite transition metal precursor was washed several times with distilled water and dried in a 120° C. constant-temperature drying oven for 24 hours to obtain a nickel-cobalt-manganese composite transition metal precursor.

Example 2

A transition metal precursor was prepared in the same manner as in Example 1, except that 0.5 mol % of sucrose was mixed with the aqueous transition metal solution.

Example 3

A transition metal precursor was prepared in the same manner as in Example 1, except that 1 mol % of sucrose was mixed with the aqueous transition metal solution.

Example 4

A transition metal precursor was prepared in the same manner as in Example 1, except that 5 mol % of sucrose was mixed with the aqueous transition metal solution.

Example 5

A transition metal precursor was prepared in the same manner as in Example 1, except that 2 mol % of glucose was mixed with the aqueous transition metal solution.

Example 6

A transition metal precursor was prepared in the same manner as in Example 1, except that 2 mol % of lactose was mixed with the aqueous transition metal solution.

Example 7

A transition metal precursor was prepared in the same manner as in Example 1, except that manganese sulfate, nickel sulfate, and cobalt sulfate were mixed in a molar ratio of 0.6:0.25:0.15 to prepare a 1.5 M aqueous transition metal solution.

Comparative Example 1

A transition metal precursor was prepared in the same manner as in Example 1, except that sucrose was not mixed with the aqueous transition metal solution.

Comparative Example 2

A transition metal precursor was prepared in the same manner as in Example 1, except that 20 mol % of sucrose was mixed with the aqueous transition metal solution.

Comparative Example 3

A transition metal precursor was prepared in the same manner as in Example 7, except that sucrose was not mixed with the aqueous transition metal solution.

Experimental Example 1

Figure 2:
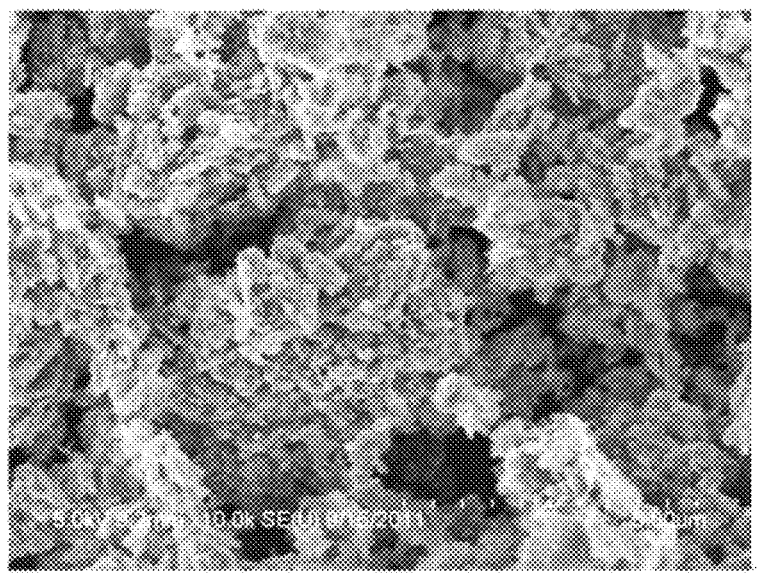
FIG. 2 is an SEM image of a precursor prepared according to Comparative Example 1, which was captured using FE-SEM (model S-4800 available from Hitachi).

SEM images of the transition metal precursors prepared according to Example 1 and Comparative Example 1, respectively, captured using FE-SEM (model S-4800 available from Hitachi), are illustrated in FIGS. 1 and 2.

Referring to FIGS. 1 and 2, it can be confirmed that the transition metal precursor of Example 1 using 2 mol % of sucrose exhibited stronger cohesive strength of primary particles than that of the precursor of Comparative Example 1 and thus particles of the precursor of Example 1 had a more spherical shape.

Experimental Example 2

Each of the nickel-cobalt-manganese composite transition metal precursors of Examples 1 to 7 and Comparative Examples 1 to 3 was mixed with $Li_2CO_3$ in accordance with the molar ratio of each composition and then sintered at 950° C. for 10 hours by heating at a heating rate of 5° C./min to prepare a cathode active material powder.

The prepared cathode active material powder, Denka as a conductive material, and KF1100 as a binder were mixed in a weight ratio of 95:2.5:2.5 to prepare a slurry. The slurry was uniformly coated on Al foil having a thickness of 20 μm. The coated Al foil was dried at 130° C., thereby completing fabrication of a cathode for a lithium secondary battery.

The fabricated cathode for a lithium secondary battery, lithium metal foil as a counter electrode (i.e., an anode), a polyethylene membrane as a separator (Celgard, thickness: 20 μm), and a liquid electrolyte containing 1M $LiPF_6$ dissolved in a mixed solvent of ethylene carbonate, dimethylene carbonate, and diethyl carbonate in a volume ratio of 1:2:1 were used to manufacture a 2016 coin cell.

Electrical properties of the cathode active material of each of the manufactured coin cells were evaluated at 3.0 to 4.25 V using an electrochemical analyzer (Toscat 3100U available from Toyo Systems).

To evaluate performance of each coin cell, charge and discharge capacities of each coin cell were measured at a voltage range of 2.75 to 4.75 V. Results of discharge capacities and charge and discharge efficiencies of the coin cells are shown in Table 1 below.

In addition, to evaluate rate characteristics, the manufactured coin cells were charged at a current of 0.5 C and a voltage range of 2.75 to 4.4 V and then discharged at a current of 1 C and discharge capacities thereof were measured. Measurement results are shown in Table 1 below.

TABLE 1

| Sample | Initial charge and discharge capacity (mAh/g) | Initial charge and discharge efficiency (%) | Discharge capacity at 1 C (mAh/g) |
|---|---|---|---|
| Example 1 | 228.0 | 84.9 | 170.4 |
| Example 2 | 218.2 | 83.8 | 167.0 |
| Example 3 | 226.2 | 84.6 | 169.2 |
| Example 4 | 215.3 | 83.4 | 163.0 |
| Example 5 | 227.2 | 84.5 | 171.2 |
| Example 6 | 224.8 | 84.1 | 168.7 |
| Example 7 | 236.5 | 78.0 | 170.9 |
| Comparative Example 1 | 213.4 | 83.1 | 160.0 |
| Comparative Example 2 | 82.0 | 84.0 | 31.0 |
| Comparative Example 3 | 213.1 | 73.6 | 145.4 |

Referring to Table 1, it can be confirmed that the coin cells according to the present invention each including the precursor treated with a particular amount of sucrose exhibited enhanced charge and discharge characteristics and rate characteristics and, in particular, the coin cell of Example 1 including the precursor treated with 2 mol % of sucrose exhibited optimum performance.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A transition metal precursor for preparation of a lithium composite transition metal oxide, the transition metal precursor comprising a composite transition metal compound represented by Formula 1 below and a hydrocarbon compound:

$$Mn_aM_b(OH_{1-x})_2 \quad (1)$$

wherein M is at least two selected from the group consisting of Ni, Co, Mn, Al, Cu, Fe, Mg, B, Cr, Ti and Zr;
$0.4 \leq a \leq 1$;
$0 \leq b \leq 0.6$;
$a+b \leq 1$; and
$0 < x < 0.5$,
wherein an amount of the hydrocarbon compound is in a range of 0.1 to 10 wt % based on a total amount of the transition metal precursor, wherein the transition metal precursor has closed pores, and at least a portion of the hydrocarbon compound is contained in the closed pores.

2. The transition metal precursor according to claim 1, wherein M is at least one transition metal selected from the group consisting of Ni and Co.

3. The transition metal precursor according to claim 1, wherein $0.5 \leq a \leq 1$.

4. The transition metal precursor according to claim 1, wherein $0.1 \leq b \leq 0.5$.

5. The transition metal precursor according to claim 1, wherein the composite transition metal compound is a composite transition metal compound represented by Formula 2 below:

$$Mn_aNi_cCo_{1-(a'+c+d)}M'_d(OH_{1-x})_2 \quad (2)$$

wherein $0.6 \leq a' \leq 1$;
$0.1 \leq c \leq 0.5$;
$0 \leq d \leq 0.1$;
$a'+c+d \leq 1$;
M' is at least one selected from the group consisting of Al, Mg, Cr, Ti, Cu, Fe, and Zr; and
x is the same as defined in claim 1.

6. The transition metal precursor according to claim 1, wherein an amount of the composite transition metal compound is 30 wt % or greater based on a total amount of the transition metal precursor.

7. The transition metal precursor according to claim 1, wherein the hydrocarbon compound is a saccharide-based material.

8. The transition metal precursor according to claim 7, wherein the saccharide-based material is at least one selected from the group consisting of fructose, sucrose, glucose, galactose, lactose, maltose, starch, and dextrin.

9. The transition metal precursor according to claim 8, wherein the saccharide-based material is sucrose.

10. The transition metal precursor according to claim 1, wherein the hydrocarbon compound is present in the transition metal precursor and/or on a surface thereof.

11. A method of preparing the transition metal precursor according to claim 1, the method comprising:
preparing an aqueous transition metal solution containing a transition metal salt for preparation of the transition metal precursor;
mixing a hydrocarbon compound into the aqueous transition metal solution in an amount of 0.01 to 10 mol % based on a total amount of the aqueous transition metal solution; and
performing co-precipitation by adding a strong base to the mixed solution.

12. The method according to claim 11, wherein the transition metal salt is a sulfate, and the strong base is sodium hydroxide.

13. The method according to claim 12, wherein the sulfate is at least one selected from the group consisting of nickel sulfate, cobalt sulfate, and manganese sulfate.

14. A cathode active material prepared by mixing the transition metal precursor according to claim 1 and a lithium precursor and sintering the mixture in an oxidizing atmosphere.

15. The cathode active material according to claim 14, wherein the cathode active material comprises lithium transition metal oxide particles and carbon present in the particles and/or on surfaces of the particles.

16. A lithium secondary battery comprising the cathode active material according to claim 14.

* * * * *